(12) United States Patent
Bresniker et al.

(10) Patent No.: US 12,743,216 B2
(45) Date of Patent: Sep. 22, 2026

(54) OPTIMIZING FOR ENERGY EFFICIENCY VIA NEAR MEMORY COMPUTE IN SCALABLE DISAGGREGATED MEMORY ARCHITECTURES

(71) Applicant: HEWLETT PACKARD ENTERPRISE DEVELOPMENT LP, Spring, TX (US)

(72) Inventors: Kirk M. Bresniker, Milpitas, CA (US); Dejan S. Milojicic, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 176 days.

(21) Appl. No.: 18/296,197

(22) Filed: Apr. 5, 2023

(65) Prior Publication Data

US 2024/0338132 A1 Oct. 10, 2024

(51) Int. Cl.
*G06F 3/06* (2006.01)

(52) U.S. Cl.
CPC .......... *G06F 3/0625* (2013.01); *G06F 3/0629* (2013.01); *G06F 3/067* (2013.01)

(58) Field of Classification Search
None
See application file for complete search history.

(56) References Cited

U.S. PATENT DOCUMENTS 7,043,650 B2 5/2006 Bresniker et al.
7,424,624 B2 9/2008 Espinoza-Ibarra et al.
8,347,005 B2 1/2013 Bresniker
10,185,499 B1 * 1/2019 Wang .................. G06F 13/1642
11,397,653 B2 * 7/2022 Zou ..................... G06F 11/2092
(Continued)

FOREIGN PATENT DOCUMENTS

WO WO-2023142091 A1 * 8/2023 ............. G06F 13/28

OTHER PUBLICATIONS

Dos Santos, S. R. et al., "Advancing Database System Operators with Near-Data Processing," Apr. 18, 2022, 30th Euromicro Int'l Conference on Parallel, Distributed & Network-based Processing (PDP), pp. 127-134.

(Continued)

*Primary Examiner* — Hosain T Alam
*Assistant Examiner* — Ryan Dare
(74) *Attorney, Agent, or Firm* — Dickinson Wright

(57) ABSTRACT

The disclosure includes a system and methods provide for optimizing performance of disaggregated memory architectures in terms of time and energy. Examples of the systems and methods disclosed herein provide for a near memory compute proximate to a disaggregated memory that can be implemented to receive, from a compute node, one or more requests to perform computation functions on data stored at the disaggregated memory and collect telemetry data for the disaggregated memory, a near memory compute proximate to the disaggregated memory, and the compute node. The systems and methods disclosed herein can also model a plurality of configurations for executing the one or more requests based on the telemetry data, select a modeled configuration of the plurality of modeled configurations for executing the one or more requests, and assign one or more of a plurality of data operators of the near memory compute according to the selected modeled configuration.

20 Claims, 6 Drawing Sheets

(56) References Cited

U.S. PATENT DOCUMENTS

| | | | | |
|---|---|---|---|---|
| 12,210,476 | B2 * | 1/2025 | Mao | G06F 15/161 |
| 2015/0177815 | A1 * | 6/2015 | Zerbe | G06F 1/3287 713/322 |
| 2015/0348627 | A1 * | 12/2015 | Taub | G11C 13/004 365/163 |
| 2018/0096735 | A1 * | 4/2018 | Pappu | H01L 25/18 |
| 2020/0034148 | A1 | 1/2020 | Sumbul et al. | |
| 2020/0097807 | A1 | 3/2020 | Knag et al. | |
| 2020/0133537 | A1 * | 4/2020 | Haghighat | G06N 20/00 |
| 2020/0364109 | A1 * | 11/2020 | Iwaki | G06F 11/1068 |
| 2022/0129171 | A1 * | 4/2022 | Karr | G06F 3/0683 |
| 2022/0197519 | A1 * | 6/2022 | Kuo | G06F 3/0634 |
| 2023/0018773 | A1 * | 1/2023 | Sudevalayam | G06F 3/0611 |
| 2023/0074229 | A1 * | 3/2023 | Jia | G06F 15/7821 |
| 2023/0121562 | A1 * | 4/2023 | Maddukuri | G06F 9/50 718/104 |
| 2023/0195373 | A1 * | 6/2023 | Pabón | G06F 3/0604 711/154 |
| 2023/0195535 | A1 * | 6/2023 | Pabón | G06F 9/455 718/104 |
| 2023/0393905 | A1 * | 12/2023 | Darji | G06F 3/0604 |
| 2023/0393971 | A1 * | 12/2023 | Markus | G06F 3/0631 |
| 2024/0111993 | A1 | 4/2024 | Korolija et al. | |
| 2024/0289038 | A1 * | 8/2024 | Pabón | G06F 3/0604 |
| 2024/0385759 | A1 * | 11/2024 | Milojicic | G06F 3/0631 |

OTHER PUBLICATIONS

Ke, L. et al., "Near-Memory Processing in Action: Accelerating Personalized Recommendation with AxDIMM," Jan./Feb. 2022, IEEE Computer Society, Theme Article: In-Memory Computing, pp. 116-127.

Kim, H. et al., "Understanding Energy Aspects of Processing-near-Memory for HPC Workloads," Oct. 5, 2015, 2015 Int'l Symposium on Memory Systems, 7 pages.

Sinha, A. et al., "MSIM: A Highly Parallel Near-Memory Accelerator for MinHash Sketch," Sep. 5, 2022, IEEE 35th Int'l System-on-Chip Conference (SOCC), 6 pages.

Korolija et al., "Farview: Disaggregated Memory with Operator Off-loading for Database Engines", Jun. 13, 2021, 14 pages.

* cited by examiner

OPTIMIZING FOR ENERGY EFFICIENCY VIA NEAR MEMORY COMPUTE IN SCALABLE DISAGGREGATED MEMORY ARCHITECTURES

BACKGROUND

The conventional approach of moving data to a CPU for computation from directly attached memory devices has become a significant performance bottleneck for emerging scale-out data intensive applications due to their limited data reuse and the overall size of the data set exceeding the capacity of direct attached devices. This has led to the proposal of disaggregated memory systems which provide memory resources over a fabric connection to one or more CPUs. At the same time, the advancement in 3D integration technologies has made the decade-old concept of coupling compute units close to the memory commonly called near memory computing (NMC) more viable. Processing right at the memory can significantly diminish the data movement problem of data-intensive applications.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
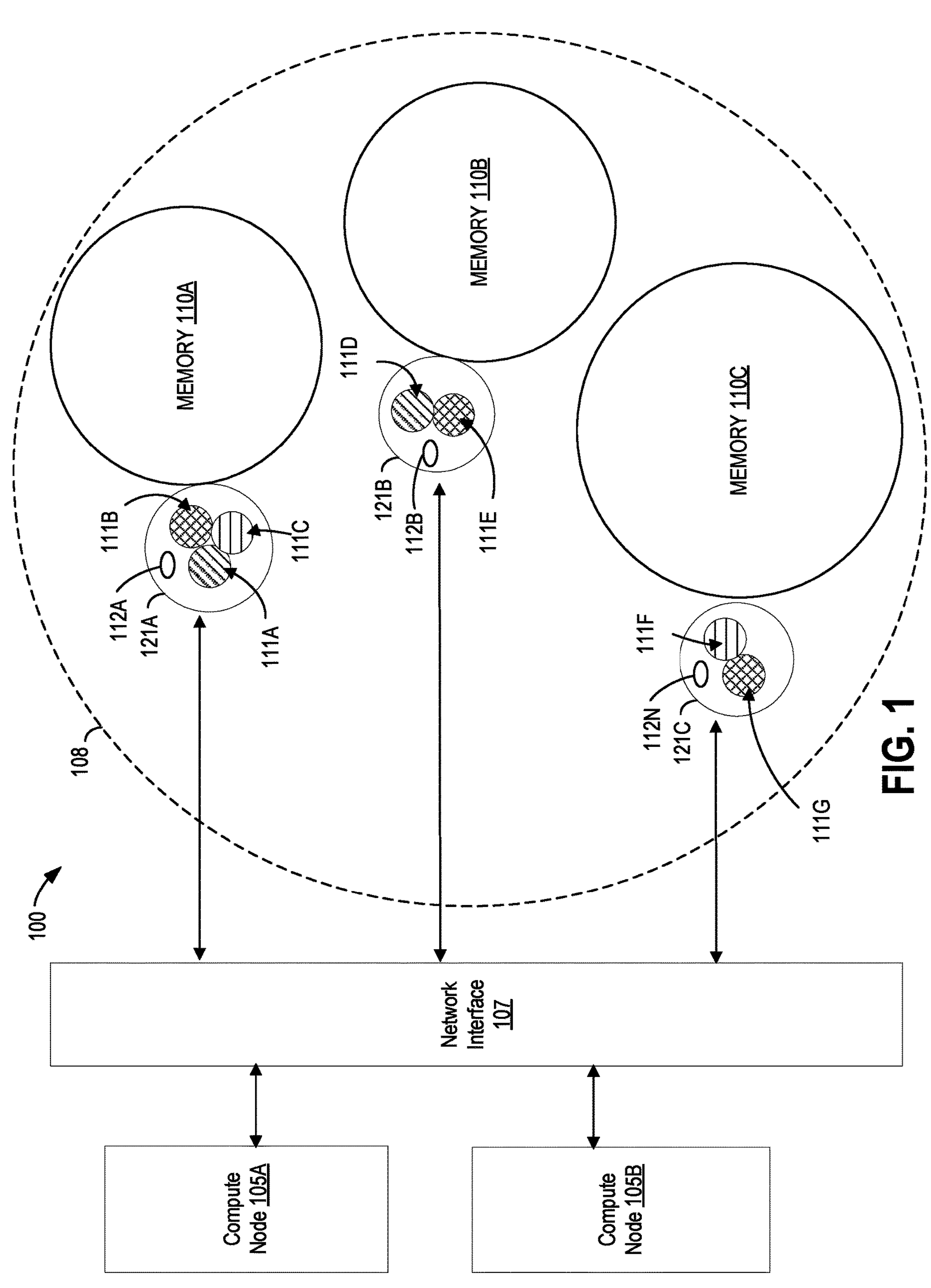
FIG. 1 illustrates an example architecture in which data query operations to disaggregated memory can be offloaded to near memory computes.

The figures are not exhaustive and do not limit the present disclosure to the precise form disclosed.

DETAILED DESCRIPTION

Over the years, memory technology has not been able to keep up with advancements in processor technology in terms of latency and energy consumption. The demise of Dennard scaling, slowing of Moore's law, and dark silicon computer performance has reached a plateau. At the same, an enormous amount of data is being generated across multiple disciplines (e.g., material science, chemistry, health sciences etc.). On traditional systems, these applications cause frequent data movement between a memory subsystem and a processor of a server. Frequent data movement within a sever impacts performance and energy efficiency. System architects have tried to bridge this gap by introducing memory hierarchies that mitigate some of the disadvantages of off-chip DRAMs. However, the limited number of pins on the CPU that can be devoted to connection to directly attached memory packages are not able to meet today's bandwidth demands of multicore processors. Disaggregated memory systems have been proposed which place additional memory subsystems on a fabric interface that can be accessed by one or more CPUs, which increases overall capacity, but at the cost of additional latency and energy required to traverse the fabric in order to access these memories.

Conventional memory hierarchy usually consists of multiple levels of cache, a main memory, and storage. For example, one conventional approach is to process data after moving data up to caches from the storage. In contrast, near-memory computing (NMC) aims at processing data close to where the data resides. This data centric approach moves compute units as close as logically and/or physically possible to the storage on which data resides and seeks to minimize the expensive data movements. For example, three-dimensional stacking enables processing close to the memory. By stacking the logic and memory together using through-silicon via's (TSVs), NMC can help in reducing memory access latency, power consumption and provides much higher bandwidth.

Moving the computation closer to memory allows for sidestepping performance and energy bottlenecks in data movement by circumventing CPU/memory-package interface pin-count limitations. NMCs accelerate access to memory by means of data operators that perform data operations close to memory and thereby eliminate overhead of multiple interconnect traversals to and from memory. NMCs connect to memory through a memory interface rather than an interconnect interface. The memory interface can provide latency at tens of nanoseconds, as opposed hundreds of nanoseconds latency (e.g., 300 ns) on a CPU-to-CPU interconnect interface, or thousands of nanoseconds on a network fabric interface. Through the use of data operators, NMCs can effectively increase available bandwidth and decrease latency to solution between memory and compute nodes. By performing operations close to the memory, the amount of data for performing a data request that needs to be transmitted between compute node and the memory can be reduced, which effectively increases the bandwidth of the interconnect and reduced latency as compared to requesting all data from the memory and performing operations at the compute node. Data operators can be in the form of addressing (e.g., pointer chasing), filtering (e.g., data reduction) or more complex computation (e.g., initialization, encryption, compression, projections, etc.).

A data operator can be disposed between the memory and network layers and can control how data moves from the memory to the network, thus controlling how the data is retrieved from a memory stack. The memory stack can include disaggregated memory, which is a form of scale-out storage, built with some number of storage devices that function as a logical pool of storage that can be allocated to any server on the network over a network fabric. Compute nodes (such as, for example, client devices) can access the disaggregated memory by establishing a connection with one or more data operators. Whenever a client makes a request, a network stack routes the request to a data operator assigned to the compute node that initiated the data request.

Databases are uniquely positioned to exploit disaggregated memory to address both the issues of inefficient data movement and DRAM capacity. Implementations of NMC disclosed herein can include physically detaching query processing from memory buffer management. Traditionally, query processing threads access base tables by reading them from a buffer pool and copying the data to their private working space. According to implementations disclosed herein, the buffer pool can be placed on the network attached disaggregated memory, with query processing nodes provisioned on demand to run a query by reading the data from the network attached buffer pool. The implementations disclosed herein provide multiple advantages, such as but not limited to: (1) reducing data movement by pushing down operators to the disaggregated memory, so that the processing nodes receive only the relevant data; and (2) reducing memory requirements for computing nodes by centralizing the buffer cache in disaggregated memory and removing unnecessary copying of the data to the compute nodes.

In contrast to remote memory, disaggregated memory systems provide network attached memory that is distinct from the memory in compute nodes, such as, but not limited to, client devices. Compute nodes in various implementations can be devices that provide ephemeral storage, networking, memory, and processing resources that can consume disaggregated memory instances. This approach allows the disaggregated memory to scale independently of the system's computing or storage capacity, and removes the need to over-provision one resource to scale another. In disaggregated memory systems network overhead is a bottleneck constraining performance.

While optimization of overall performance is a motivator for leveraging disaggregated memory systems, energy consequences of such utilization may be of equal or greater benefit as the demand for ever more sustainable IT operations increases. Due to proximity of NMC to memory nodes, the availability of wide bandwidth interfaces offers a potential reduction in energy per bit of data for transferring data between components of a disaggregated memory system. However, the emergence of cost effective integrated photonic connections in the data transfer path with low energy per bit data movement and lossless transmission over any distance (e.g., up to thousands of meters) makes system-wide level energy assessments more complex and challenging. The complexity increases even more so if photonic circuit switching is introduced for directing data traffic. For NMCs where the data operators are not fixed function, the number of operators is usually limited and the limited number of operators need to be shared for different tasks. Overall energy efficiency could potentially be a factor in how to effectively manage this limited resource.

For example, disaggregated memory systems may be spread across a network fabric as interconnected memory nodes with compute nodes accessing the memory nodes for data processing. Throughout the entire system, there may be numerous variables of how much energy is consumed on a system-wide basis, and by individual components, to perform a computation task and/or to exchange data between components. The determination of energy consumption becomes much more complicated as compared to a conventional memory system of a CPU, which may have a local memory or cache attached to the CPU, that pulls data from a central location for processing by the CPU. The energy consumption may be relatively low in such conventional systems, plus the determination is straightforward because the metrics, such as latency, bandwidth, and power consumption, are already known and fixed. As a result, the determination turns on whether the computational task can be executed or not within operator defined performance criteria given the fixed and known metrics. In the case of a distributed memory system, which can leverage NMCs and data operators, the determination becomes much more complicated.

Implementations of the present disclosure provide for mechanisms that can measure energy consumption effects of NMCs, as well as data operators, resulting from executing computations (e.g., in terms of energy per bit of data to perform a task) and data movement between components (e.g., in terms of energy per bit of data transferred). The implementations of the present disclosure can also measure time consumption (or latency) effects for executing a task (e.g., in terms of time). The energy consumption and latency can be used as optimization metrics in disaggregated memory architectures, which can be leveraged to optimize performance of disaggregated memory architectures in terms of time and energy.

The present disclosure provides for a consumption engine that collects telemetry data pertaining to energy consumption in connection with utilizing NMC functionality to perform one or more data processing tasks. The telemetry data may include one or more of: (i) computational energy in terms of energy consumed while performing one or more tasks and time required to perform the one or more tasks, and (ii) communication energy in terms of energy consumed to transmit/receive data and time needed to so. In an example implementation, the consumption engine may be included as part of the NMC. However, the present disclosure is not limited to this implementation. The telemetry data can be collected for each of the disaggregated memory, memory-to-NMC interface, the NMC, NMC-to-client interface, compute node, NMC-to-peer NMC interface, and peer NMC.

Implementations according to the present disclosure may also include a modelling engine configured to use telemetry data to model a plurality of configurations of a disaggregated memory system for performing one or more data processing tasks. For example, the modelling engine may model the plurality of configurations based on a data processing request or a number of requests received from a compute node. Each modeled configuration may utilize the data operator resources of an NMC to varying degrees, where each model uses a different amount of data operator resources. In an illustrative example, the modeled configurations include (a) a baseline consumption model (sometimes referred to as a first consumption model) in which the NMC is configured as a pass-through (e.g., no data operator resources are consumed, all computation is performed at the compute node) and (b) maximal consumption model (sometimes referred to as a second consumption model) in which client-side computation is minimal or zero and substantially all computation functions to perform the one or more tasks consume data operator resources of the NMC (e.g., compute node resource energy consumption is negligible). The modeling engine can generate a number of intermediate model configurations between the baseline consumption model and the maximal consumption model, where each intermediate model uses varying amount of data operator resources to perform the one or more tasks. The modeling engine can be implemented to output telemetry consumption factors for each modeled configuration. The telemetry consumption factors can comprise a first factor that is predictive of energy consumed to execute the one or more tasks on a per modeled configuration basis and a second factor predictive of an amount of time for executing the one or more task on a per modeled scenario basis. In an example implementation, the modeling engine may be included as part of the NMC. However, the present disclosure is not limited to this implementation.

Implementations according to the present disclosure may also include an optimization engine configured to select a modeled configuration from the plurality of modeled configurations for executing the one or more data processing tasks. The optimization engine may also assign one or more of the plurality of data operators according to the selected modeled configuration. For example, the optimization engine may use the telemetry consumption factors to optimize the NMC, and data operator usage, according to the modeled configuration. A tradeoff between time consumed and energy consumed may be considered as part of the optimization, for example, performing computations at a faster rate (e.g., less time) generally consumes more energy. Accordingly, optimizing the disaggregated memory system may comprise balancing between minimizing the second factor (e.g., time) and minimizing the first factor (e.g., energy consumed). For example, depending on energy consumption or time desired by an operator for performing tasks, the use of the NMC can be optimized in part by referencing the telemetry consumption factors and selecting an optimal modeled configuration. In an example, optimization can be performed on a data operator basis, for example by assigning certain functions to data operators to optimize energy consumption locally within the NMC. For example, optimization can include selecting a configuration modeled by the modelling engine that provide optimal performance and assigning data operators in accordance with the selected configuration. Optimization can also be performed globally, for example, by assigning functions to peer NMC (and data operators therein) and/or to compute nodes. In an example implementation, the optimization engine may be included as part of the NMC. However, the present disclosure is not limited to this implementation.

Accordingly, implementations disclosed herein provide mechanisms for determining energy consumption and time to completion of one or more data processing tasks. If both energy and time-to-completion are known, then demand and margin shaping can be implemented by customers and service providers. For example, telemetry data available as an optimization consideration in accordance with implementations disclosed herein can also be included in revenue structure of customers and service providers. Thereby, allowing increases in energy efficiency and sustainable operations offered at higher margins. Furthermore, the ability to measure energy consumption throughout disaggregated memory systems can afford customers and service provides informed choice in trading off performance versus energy versus infrastructure cost. That is, implementations disclosed herein can be implemented to measure consequences in terms of energy consumed and time spent by disaggregated memory systems to reach a solution, and therefore, customers can utilize the implementations disclosed herein to optimize operations for low energy consumption. In another example, network operators can use the disclosed implementations to minimize costs and maximize profit in providing resource through a tradeoff of time to solution versus energy consumed compared to the revenue of operating the equipment.

As used herein, baseline and maximal in the context of the consumption models (or configuration) refers to an amount of computation performed by the NMC, and not necessarily to a predicted or observed energy consumption. That is, baseline consumption model is a model in which the NMC operates as a pass-through and maximal consumption model is a model in substantially all computation functions consume data operator resources of the NMC (e.g., maximal computation performed by the NMC). In some cases, the baseline consumption model may be the most energy efficient model, while, in other cases, the maximal consumption model may be the most energy efficient. In yet other cases still, an intermediate consumption model may be the most energy efficient.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example architecture 100 in which data query operations to a memory can be offloaded to NMCs. FIG. 1 includes a plurality of compute nodes 105 (e.g., a first compute node 105A and a second compute node 105B) connected to a disaggregated memory 108 via a network interface 107. Compute nodes 105 may issue data queries requesting data from disaggregated memory 108 as part of data operations. Compute nodes 105 may be implemented as any computation device connected to the disaggregate memory 108 via network interface 107. For example, a compute node 105 may be a client device. As another example, compute node 105 could be a server with CPU, memory, network interfaces. In an example implementation, computer node 105 may be implemented as a computer system 600 of FIG. 6. In another example, a number of compute nodes can be organized in clusters, where each cluster represents a compute node 105.

The disaggregated memory 108 comprises a logical pool of memories 110 (e.g., memory 110A, memory 110B, memory 110N, etc.). Each memory 110 of FIG. 1 may be an example disaggregate memory node on an interconnect fabric. For example, a plurality of disaggregated memory nodes 110 may connected via a plurality of interconnected fabrics. Accordingly, disaggregated memory 108, in some examples, may serve the purpose of memory that was disaggregated from compute nodes 105 and can be shared across a plurality of computer nodes 105. In some cases, the disaggregated memory may be shared by all nodes. Network interface 107 may be an example of a fabric interface.

The disaggregate memory 108 also comprises a plurality of dynamic regions 121 (e.g., a first dynamic region 121A, a second dynamic region 121B and a third dynamic region 121N). Each dynamic region 121 (also referred to herein as an NMC) comprises one or more data operators 111 (e.g., a first data operator 111A, a second data operator 111B, a third data operator 111C, a fourth data operator 111D, a fifth data operator 111E, and a sixth data operator 111N). Data operators 111 may be functions offloaded close to memory to improve performance of computation operations, such as addressing (e.g., pointer chasing, hashing, etc.), data filtering (e.g., projections and views), and computation on data (e.g., compression, encryption, etc.). Data operators may not alter total processing to be executed, but can be used to relocate operations proximal to a memory 110 of the disaggregated memory system 108. In one example, the plurality of data operators 111 include query operators comprising: (i) selection operators configured to filter data according to a collection of predicates, (ii) projection operators configured to reduce the columns returned and reduce memory accesses, (iii) aggregation operators, (iv) distinct operators, (v) group-by operators configured to combine tuples (e.g., distinct, group by aggregation), (vi) regular expression matching operators, (vii) encryption operators and (viii) system support operators configured to process data in-situ before sending data (e.g., encryption/decryption) and perform system optimization tasks like packing data to reduce the overall network usage. Data operators 111 may be implemented using ASICs, using FPGAs, SmartNICs, ARM, other processors, etc. In an example implementation, a data operator 111 may be implemented as an instance of computer system, e.g., computer system 600 of FIG. 6.

In some implementations, each dynamic region 121 comprises one or more data stores 112 (e.g., data stores 112A, data stores 112B . . . data stores 112N). Data stores 112 may store metrics, such as optimization metrics according to the implementations disclosed herein. Data stores 112 can also store policies for assigning, loading, and managing data operators 111 loaded into corresponding dynamic region 121. For example, data stores 112 may store metrics of energy consumption per bit and latency metrics, which may be leverage by the implementations disclosed herein to optimize data operators for executing requested tasks according to policies.

The disaggregated memory 108 can be accessed by one or more of the plurality of compute nodes 105. For example, first compute node 105A and second compute node 105B can both access the disaggregated memory 108 and/or one of the first computer node 105A and the second computer node 105B can access the disaggregated memory 108. In one example, compute node 105A and computer node 105B may each invoke a data request in the form of a projection and selection of two data queries, which are offloaded to the disaggregated memory 108 as data operators 111 of a corresponding dynamic region 121, while a joint and final projection is executed at the compute nodes 105A and 105B. In one example, the disaggregated memory 108 includes a programming interface comprising a data API for path operations and connection management operations. By connecting the data API to memories 110, data operators 111 can be offloaded to the disaggregated memory 108 effectively functioning as a bump-in-the wire stream processor.

Data operator pipelines can be constructed from individual blocks that implement a given data operator and provide standard interfaces to combine the data operators into pipelines. The modular nature of the pipelines allows the operators to be easily swapped and extended (e.g., join operators). An example data operator pipeline is provided below in connection with FIG. 3.

Figure 2:
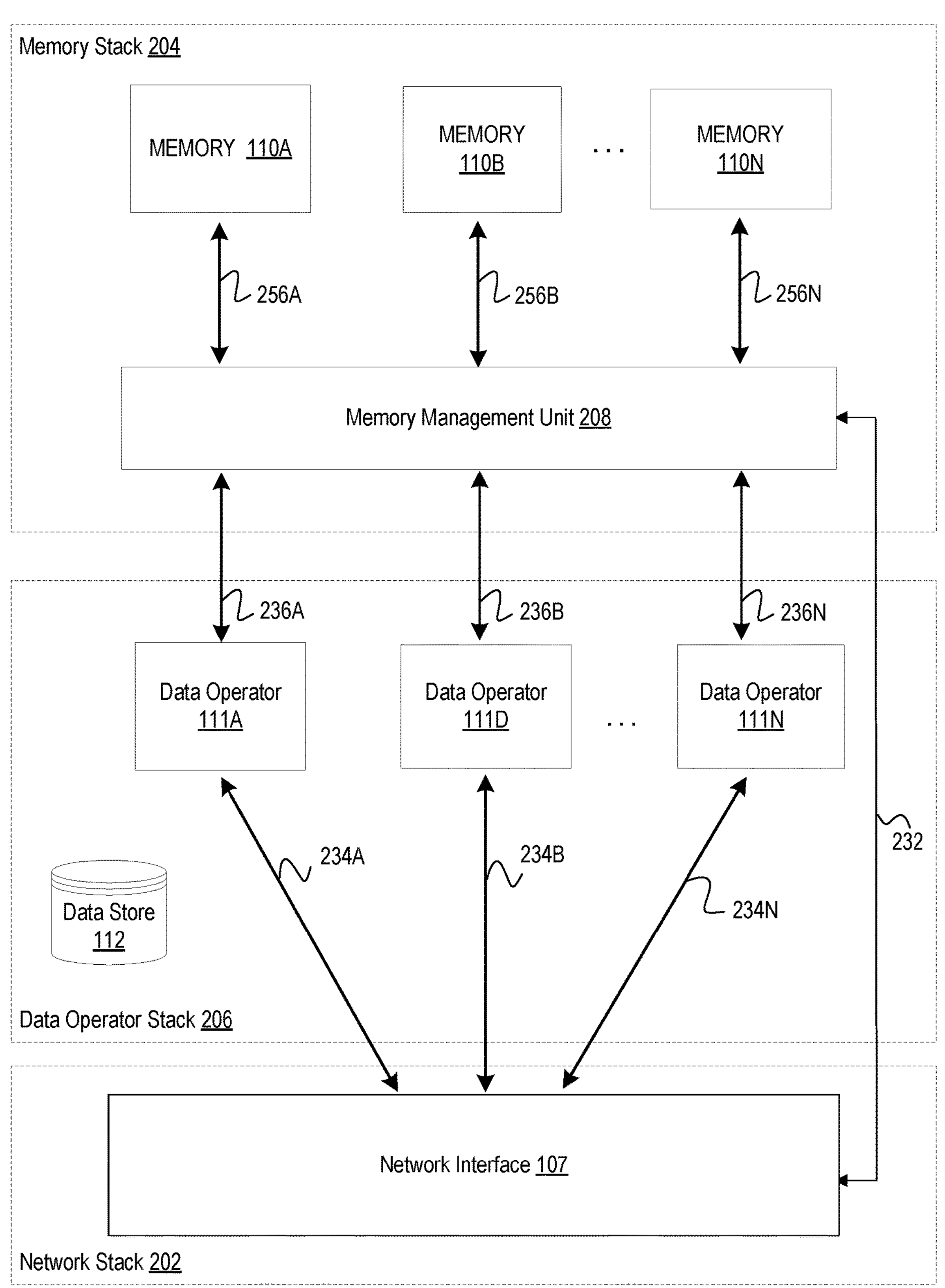
FIG. 2 illustrates another example architecture in which the systems and methods described herein may be implemented.

FIG. 2 is a schematic block diagram of architecture 100 in which the systems and methods described herein may be implemented. The architecture 100 includes a memory stack 204, a data operator stack 206, and a network stack 202. Data is transmitted from one or more compute nodes (e.g., compute node 105A, compute node 105B) to and from the memory stack 204 via the network stack 202 and the data operator stack 206. The memory stack 204 includes disaggregated memory (e.g., disaggregated memory 108) comprising a pool of memory (e.g., memory 110A, memory 110B . . . memory 110N) connected to a memory management unit 208 via a plurality of channels (e.g., channel 256A, channel 256B . . . channel 256N). The data operator stack 206 includes a plurality of data operators 111 (e.g., data operator 111A, data operator 111B . . . data operator 111N) and one or more data stores 112. The plurality of data operators 111 are connected to the memory management unit 208 and network interface 107. The plurality of data operators 111 are connected to the memory management unit 208 via a plurality of memory channels 236 (e.g., channel 236A, channel 236B . . . channel 236N). Channels 236 may be illustrative of a memory interface through which the data operator stack 206 (e.g., an example of a dynamic region 121) connects with the memory stack 204. The network stack 202 is configured to decode incoming data stream and transfer data along to the appropriate data operator 111. The network stack 202 includes network interface 107. The network interface 107 is connected to the plurality of data operators 111 via a plurality of channels 234 (e.g., channel 234A, channel 234B . . . channel 234N). In one configuration, the network interface 107 is an example of a fabric configured to transmit data across a plurality of interconnect fabrics to each data operator of the plurality of data operators 111. In this case, channels 234 may be examples of fabric interfaces. The plurality of interconnect fabrics may be connected to one or more disaggregate memory nodes. The network interface 107 according to implementation disclosed herein may connect data operator stack 206 to one or more compute nodes 105, as shown in FIG. 1, as well as to other peer data operator stack 206. That is, for example, network interface 107 may function as a client fabric that connects a dynamic region to compute nodes through client fabric interfaces, while also functioning as a peer fabric that connects a dynamic region (e.g., dynamic region 121A) to one or more peer dynamic regions (e.g., second dynamic regions 121B, 121N, etc.).

The network stack 202 is configured to send/receive data to/from the data operator stack 206. For example, the network stack 202 receives a data query (e.g., from a compute node) and forwards it to the data operator stack 206. The network stack 202 manages all connections between the compute nodes and the plurality of data operators 111. The network stack 202 receives/sends data via the network interface 107. The network interface 107 allows compute nodes on a network to exchange data in main memory, bypassing the operating system and the CPU resources. In one example, the network interface 107 includes a connection protocol that uses zero-copy networking to read data directly from the main memory of one system and write data directly to the main network of another system, improving performance and throughput by freeing up server resources in parallel high-performance computing (HPC) clusters.

The operator stack 206 includes the dynamic logic necessary to allocate data operators to the disaggregated memory. Each data operator 111 may be configured to perform NMC (e.g., near memory processing operations). The data operator stack 206 can process data for multiple compute nodes at the same time. For example, the data operators 111 are able to process a number of data queries. The data can be processed within operator pipelines in a streaming fashion where each stage of the processing is fully pipelined so that different stages of processing within each data operator 111 may occur simultaneously. This configuration may be used to exploit both spatial parallelization (e.g., simultaneous execution of tasks by a plurality of processing units) through concurrent dynamic regions and pipelined parallelization. Pipeline parallelization can refer to multiple operators depending on each other, while the execution of each operator can overlap with other data operators 111. Both of these can contribute to the overall performance of the system. It is through the operator stack that the system can identify relationships to previously identified structures and perform optimizations to access data. Optimizations may include prefetching data to be accessed, caching the data in a higher-level cache to be reused frequently, and/or precomputing by speculatively updating metadata to reflect the upcoming 10, buffer allocation, or other parameters associated with the application and data.

The plurality of data operators 111 can be managed via a management operator according to policies and indicators stored in data stores 112. In an example, a management operator can be one of operators 111 that is loaded first and, based on being loaded first, configured to manage other, subsequently loaded data operators 111. The management operator monitors the processing load of other data operators and reacting based on policies. The management operator may also provide programmatic and user interface to other tools and system administrations. In another example, a management operator can be a controller, which can be implemented, for example, as computing device 600 of FIG. 6.

In one example, the management operator is the first data operator that boots-up (e.g., turns on, starts, comes-on-line, etc.). In configurations where the first data operator that boots-up is the management operator, the first operator may be referred to as a "lead operator." The management operator remains on throughout data operations. If a management operator crashes, any one of a plurality of operators can become the management operator. For example, if a management operator crashes, then a non-management operator can become a management operator.

The data operator stack 206 sends/received data to/from the memory stack 204 via a plurality of connections 236. The memory stack 204 implements the pool of memories 110 and can be used as regular memory, with data being loaded from storage as needed. The memory stack 204 is configured to handle memory allocations, address translations, and concurrent accesses. The memory stack 204 includes memory management unit 208 to translate addresses to the memory. The memory management unit 208 is connected to memory 110 within the memory stack 204 via a plurality of channels (e.g., channel 256A, channel 256B . . . channel 256N, etc.). For example, the plurality of channels 256 may route a memory 110 to access memory management unit 208. Memory may be allocated to each channel in a striped pattern to optimize the available bandwidth. The operator stack 206 may interface with memory stack 204 to receive data and metadata from the memory stack 204.

Compute nodes can access the disaggregated memory by opening a connection to one of the dynamic regions 121 containing one or more data operators 111, each able to contain one of possible operator pipelines. When a compute node makes a read request, the network stack 202 routes the request to a dynamic region in the operator stack 206 containing data operators 111 assigned to the compute node that initiated the request. The read request is forwarded to the memory stack 204, which translates a virtual address to a physical address in a memory 110, and then issues the actual data request to the memory 110. The compute nodes may have local catalog information that can be used to determine virtual addresses of the memories to be accessed. The returned data is streamed back to the dynamic region 121, where loaded data operators 111 are applied to the data. Finally, the resulting data is forwarded to the network stack 202, and further sent directly to the compute node.

Figure 3:
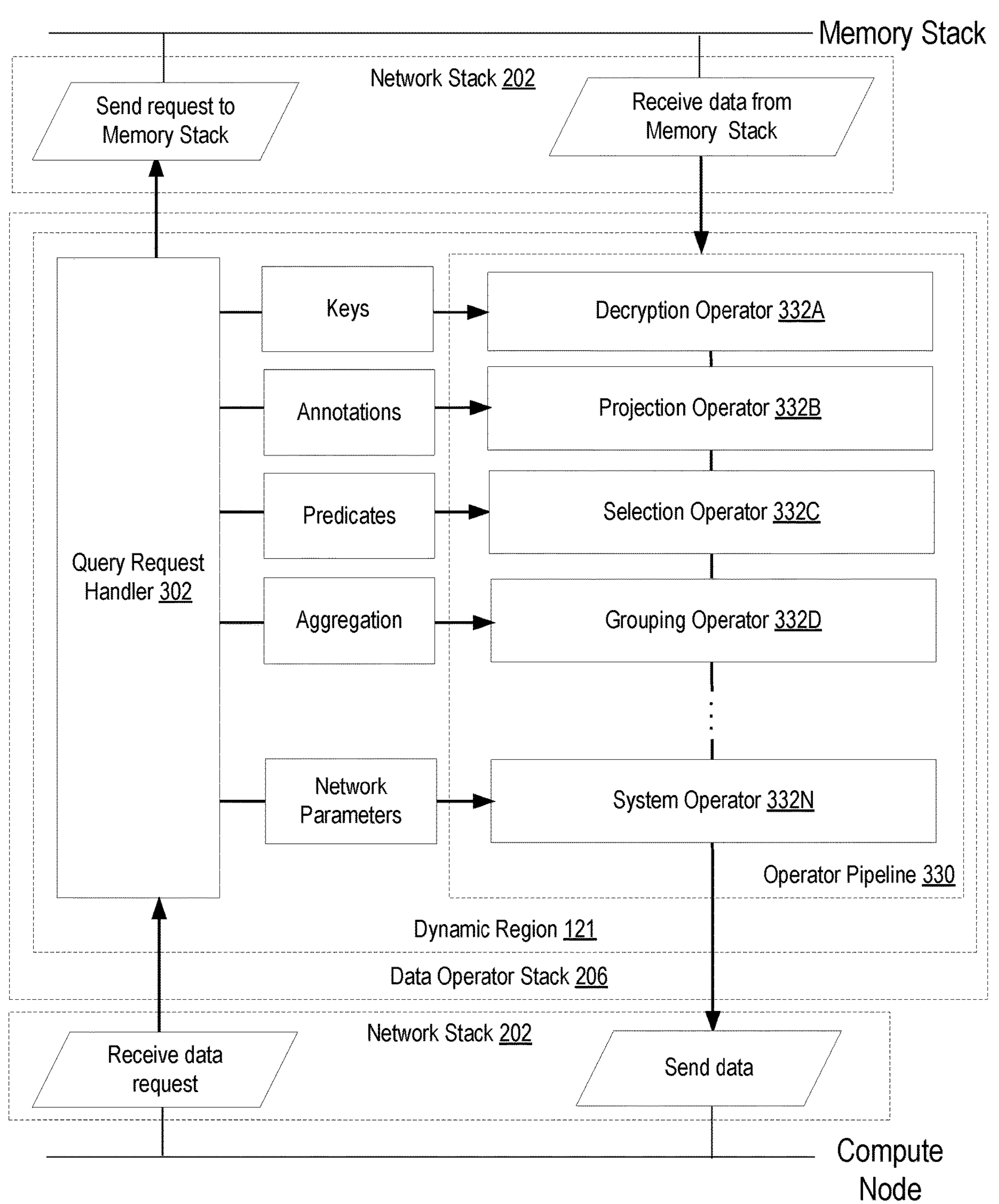
FIG. 3 illustrates an example data operator stack that can be implemented in disaggregated memory.

FIG. 3 illustrates an example dynamic region 121 a of data operator stack 206. FIG. 3 illustrates a generic operator pipeline 330 included in a dynamic region 121, which includes a plurality of data operators 332A-332N (collectively referred to herein as data operators 332) that can process a data object. In one example, the plurality of operators 332 may include projection, selection (e.g., predicate selection, regular expression matching), grouping (e.g., distinct, group by, and aggregation), and system support (e.g., encryption/decryption). In the illustrative example of FIG. 3, the plurality of operators includes a decryption operator 332A, a projection operator 332B, a selection operator 332C, a grouping operator 332D, and a system operator 332N. The operators 332 within the operator pipeline 330 may vary depending on the requested set of queries to be executed. One or more operators 332 may have fixed functions or programmable functions, which, in the case of programmable functions can be reassigned.

Each operator pipeline is allocated to a corresponding compute node (e.g., one of corresponding compute nodes 105). The operator pipeline 330 includes one or more data operators 332, each of which provides partial query processing (e.g., processing of data read operations) on data operations to disaggregated memory. The query can be forwarded to the query request handler in the operator stack through query request handler 302. Query request handler 302 can request the data object associated with the query from the memory stack (e.g., memory stack 204). This may be accomplished through addressing, which can allow data to be read in both row store and column store formats, based on the given request. In some embodiments, data can also be read in graph formats or other representations. The data operators 332 used for processing the data object can be precompiled to and can be deployed (e.g., loaded) to dynamic region 121 at runtime. Query request handler 302 can submit the data object to one or more data operators 332 depending on the query.

When a query request arrives, it is first forwarded to the query request handler 302, which requests the data from the memory stack. At the same time, any necessary parameters for additional processing are forwarded to the data operators 332 in the pipeline. Data arriving from the memory is processed in a streaming fashion by these data operators. Once the processing is done, the resulting data is sent back to the client via the network stack.

As an illustrative embodiment, decryption operator 332A may decrypt the data arriving from memory stack 204 if the data is encrypted. For this operation, compute nodes may be required to provide specific keys used for decryption from cipher to plain text. These keys can be provided with the query request. This can allow the system to provide additional levels of security, which is important in modern disaggregated environments.

Projection operator 332B can return a subset of the data object. Projection operator 332B can read a table from the disaggregated memory, parse the incoming data stream based on query parameters describing tuples and their size, and project only the necessary columns into the pipeline for further processing using annotation. This decreases the amount of data provided to subsequent stages and ultimately reduces the amount of overall data movement. Projection operator 332B can use annotation to annotate the tuples with parameters from the requested query. The parameters may state which columns are part of the projection, selection, and grouping phases. Projection operator 332B may annotate the subset of the data object and forward it to selection operator 332C.

Selection operator 332C can filter data further in order to reduce the amount of data ultimately sent over the network, thus reducing I/O overheads. Selection operator 332C can use predicate selection, regular expression matching, vectorization, or other methods to filter the data. Predicate selection can occur by comparing the value of an attribute of the data object against a constant provided in the query. The annotations from projection operator 332B can assist in determining what is evaluated during the predicate matching phase. Regular expression matching can use string matching via multiple parallel engines in operator stack 206. Performance of this operator may be dominated by the length of the string and does not depend on the complexity of the regular expression used. Vectorization can occur by reading data in parallel from multiple channels in operator stack 206. Individual tuples can be emitted to a set of selection operators operating in parallel. The number of parallel operators may be chosen based on the number of memory channels and the tuple width. Vectorization may be implemented for simpler queries that can be parallelized without data dependencies.

Grouping operator 332D can perform aggregation and eliminate repeated column entries before they are sent to the client application and device. Grouping operator 332D can hash the values and preserve the entries in a hash table in the memory stack. In some examples, the hash table can use cuckoo hashing with several hash tables that can be reviewed in parallel. The cuckoo hashing can evict entries from a hash table and insert them into a separate hash table with a different function to reduce collisions. Grouping operator 332D may group data via aggregation and flush data entries from the hash table based on the requested aggregation results. Aggregation can result in specific groupings that can perform a large portion of the processing already in the disaggregated node (which can be determined based on the particular application) without the need to move all the data to the client first and then fully process the data.

System operator 332N can prepare the data filtered by projection operator, selection operator, and grouping operator to be sent to the compute node. System operator 332N may also encrypt the data as needed or as requested by the compute node. System operator 332N may also pack data based on the annotated columns from projection operator 332B, resulting in more efficient utilization of the available network bandwidth. The packing may use an overflow buffer to sustain the line rate. In the case of vectorization, the tuples can be combined from each of the parallel pipelines using a round-robin arbiter. System operator 332N may also comprise a sender unit to produce the correct header information in network stack. The sender unit can create RDMA commands without information on the final data size which can allow filtering in the operators where final data size is not known at a time when the request is issued. The sender unit can also forward the data to network stack to be sent to the client application and device.

Figure 4:
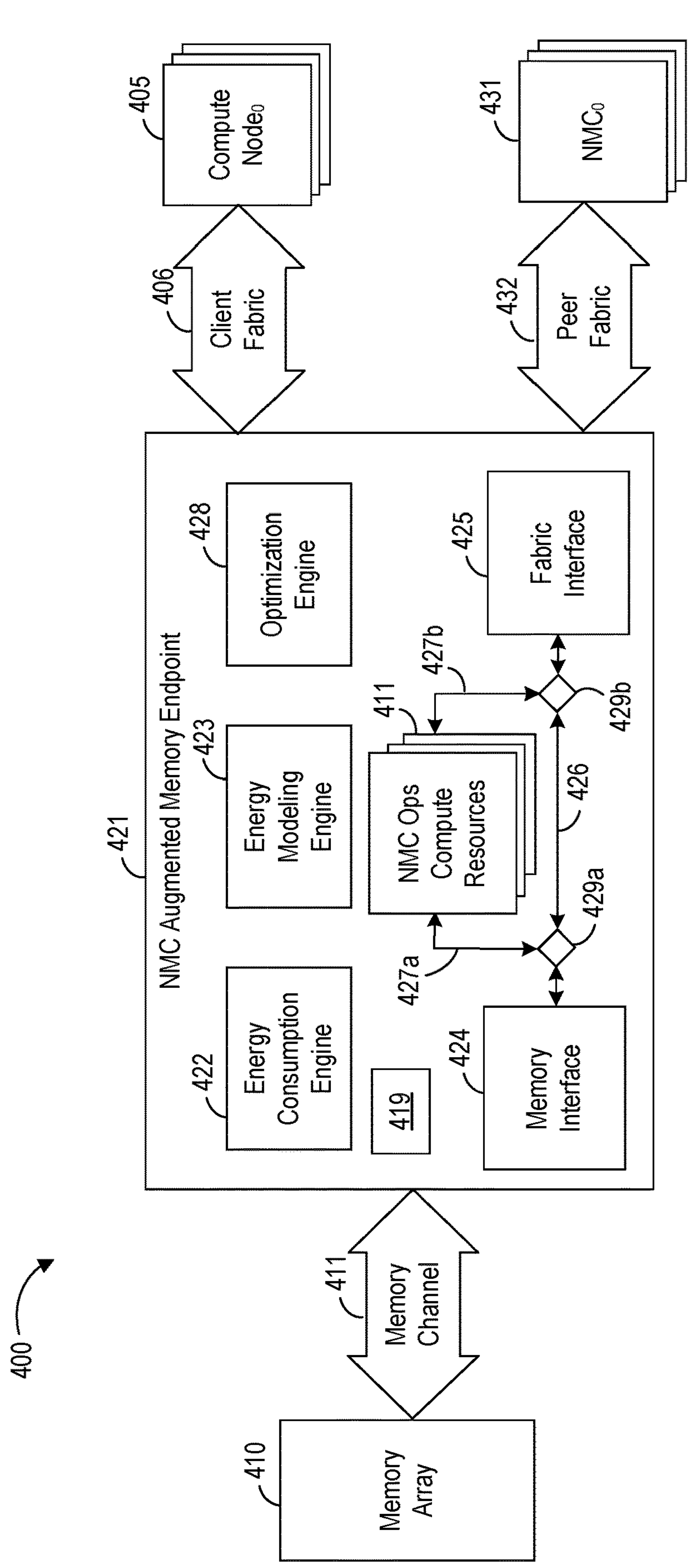
FIG. 4 is schematic box diagram of a disaggregate memory system for telemetry data-based optimization in accordance with implementations disclosed herein.

FIG. 4 is schematic box diagram of a disaggregate memory system 400 for optimization based on telemetry data in accordance with implementations disclosed herein. Disaggregate memory system 400 comprises an NMC 421 proximate to a memory array 410 via a memory channel 401. The NMC 421 can be implemented as a function integrated into a memory die (for example, at the bottom of a stack of memory die in a single packaged component). As another example, NMC 421 may be implemented as a chiplet on a substrate next to a memory die. In another example, the NMC 421 may be a packaged component on a memory board proximal to memory components (e.g., DIMM or SSD). In yet another example, NMC 431 may be implemented as a general purpose CPU coupled to its own main memory storing instructions thereon that, when executed by the CPU, perform processes and functionality disclosed herein. In one example, NMC 431 may be implemented as computing system 600 described below in connection with FIG. 6. The NMC 421 may be referred to as a near memory computing node in some implementations.

The memory array 410 and NMC 421 may be examples of one of memories 110 and dynamic region 121, respectively. Memory channel 401 may be example implementations of memory channels 236. The NMC 421 is connected to one or more compute nodes 405 through a client fabric 406 and to one or more peer NMCs 431 through a peer fabric 432. The client fabric 406 may be an example of network interface 107 and one or more compute nodes 405 may examples of compute nodes 105 of FIG. 1. Peer NMC 431 may be examples of instances of dynamic region 121 and the peer fabric 432 may be implemented as network interface 107. The peer fabric 432 and client fabric 406 may be unified as a single network, for example, as shown in FIG. 1. In another example, peer fabric 432 and client fabric 406 may be segregated, and thus implemented as separate networks.

Each component of disaggregate memory system 400 consumes energy to perform data related functions at a respective component. For example, memory array 410 may consume energy per bit of data to perform a read operation or a write operation, along with consuming static power, static power due to leakage, or ongoing functions such as refresh. Memory channel 401 consumes energy per bit of data transferred over the interface at a given bandwidth. Similarly, client fabric 406 and peer fabric 432 each consume energy per a bit of data transferred over the interface at a respective bandwidths. The one or more compute nodes 405 and one or more peer NMCs 431 each also consume energy to perform read operations or a write operations, along with consuming static power due to leakage.

The NMC 421 also consumes energy during operation and/or idle. For example, the NMC 421 comprises a memory interface 424 that connects the NMC 421 to memory channel 401 and a fabric interface 425 that connects NMC 421 to the client fabric 406 and/or the peer fabric 432. One or more data operators 411 are provided as resources that can be consumed, which are communicatively connected between memory interface 424 and fabric interface 425 for executing functions as set forth above. The one or more data operators 411 may be example implementations of data operators 111 of FIG. 1. Collectively the data operators 411 consume energy to perform assigned functions. The data operators 411 may have fixed functions or programmable functions, which, in the case of programmable functions can be reassigned. Energy consumed by each data operator 411 is dependent a respective data operator 411 being invoked for performing the assigned function. The NMC 421 also consumes static power due to leakage. The memory interface 424 and fabric interface 425 each consume energy per a bit of data transferred over the respective interface, as well as consuming static power due to leakage.

NMC 421 is shown in FIG. 4 as containing decision points 429*a* and 249*b* (collectively referred to herein as decision points 429) for an operation flow. If data operators 411 are not required for performing an operation, or if resources for data operators 411 are not available, then the operation flow pass-through the NMC 421 via arrow 426. Otherwise, the operation flow invokes one or more data operators 411 via arrows 427*a* and 427*b*. This operation is described in greater detail below, Table 1 below provides a non-exhaustive listing of a number of energy consumption metrics related to performing computational tasks (sometimes referred to herein as computation metrics).

TABLE 1

| Computation Metrics | | |
|---|---|---|
| Metric | Description | Measurable Unit |
| $Ea_w$ | Memory array energy consumed per write operation | (J/bit) |
| $Ea_r$ | Memory array energy consumed per read operation | (J/bit) |
| $Pa_s$ | Memory array static power consumed | (W) |
| $Bm_r$ | # of bits read from memory array to NMC | (bits) |
| $Bm_w$ | # of bits written to memory array from NMC | (bits) |
| $Emc_T$ | Memory channel energy consumed per bit transferred | (J/bit) |
| BWmc | Memory channel bandwidth | (bit/s) |
| $Em_T$ | Memory interface energy consumed per bit transferred | (J/bits) |
| $Pm_s$ | Memory interface static power consumed | (W) |
| Eo[n][i] | NMC energy consumed per bit processed [i] per data operator [n] | (J/bits) |
| $Po_s$ | NMC static power consumed | (W) |
| $Bo_r$[n][i] | NMC bits processed for read operation per data operator [n] per bit [i] | (bit) |
| $Bo_w$[n][i] | NMC bits processed for write operation per data operator [n] per bit [i] | (bit) |
| $Ef_T$ | Fabric interface energy consumed per bit transferred | (J/bits) |
| $Pf_s$ | Fabric interface static power consumed | (W) |
| $Ecf_T$[n][i] | Client fabric energy consumed per bit [i] transferred per compute node [n] | (J/bit) |
| BWcf[n][i] | Client fabric bandwidth per compute node [n] per bit [i] | (bit/s) |
| $Bc_r$[n][i] | # of bits [i] transferred for read operation per compute node [n] | (bit) |
| $Bc_w$[n][i] | # of bits [i] transferred for write operation per compute node [n] | (bit) |
| $Epf_T$[m][i] | Peer fabric energy consumed per bit [i] transferred per peer NMC [m] | (J/bit) |
| BWpf[m][i] | Peer fabric bandwidth per peer NMC [m] per bit [i] | (bit/s) |
| $Bp_r$ | # of bits transferred for read operation per peer NMC | (bit) |
| $Bp_w$ | # of bits transferred for write operation per peer NMC | (bit) |

Each component of disaggregate memory system 400 requires time to perform functions before transferring data to a subsequent component (e.g., latency of each component). For example, memory array 410 may have a memory array read or write latency for the amount of time to execute a read or write operation, respectfully. Memory channel 401 may have a memory channel latency for an amount of time to perform a data transfer between the memory array 410 and NMC 421. The memory interface 424 may have a memory interface latency for an amount of time to transfer data between memory channel 401 and NMC 421. The NMC 421 may have a NMC latency for an amount of time to execute functions on invoked data operators 411 (if any). The fabric interface 425 may have a fabric interface latency for an amount of time to transfer data between NMC 421 and peer fabric 432 and/or client fabric 406. Client fabric 406 and peer fabric 432 may each of have a latency for an amount of time to perform a data transfer between NMC 421 and each one or more compute nodes 405 or one or more peer NMCs 431, respectively.

Table 2 below provides a non-exhaustive listing of a number of latency metrics.

TABLE 2

| Latency Metrics | | |
|---|---|---|
| Metric | Description | Measurable Unit |
| $Lo_s$ | NMC execution latency | (s) |
| $La_r$ | Memory array read operation latency | (s) |
| $La_w$ | Memory array write operation latency | (s) |
| Lmc | Memory channel latency | (s) |
| Lm | Memory interface latency | (s) |
| Lf | Fabric interface latency | (s) |

TABLE 2-continued

| Latency Metrics | | |
|---|---|---|
| Metric | Description | Measurable Unit |
| Lpf | Per Peer NMC latency | (s) |
| Lcf | Per compute node latency | (s) |

In the illustrative example of FIG. 4, NMC 421 hosts an energy consumption engine 422, an energy modeling engine 423, and an optimization engine 428. In this case, metrics, such as those shown in Tables 1 and 2, may be stored in data stores (such as data stores 112). However, implementations disclosed herein are not limited to this configuration. In some implementations, energy consumption engine 422, energy modeling engine 423, and/or optimization engine 428 may be hosted in another device of disaggregate memory system 400. For example, energy consumption engine 422, energy modeling engine 423, and/or optimization engine 428 may be hosted by memory array 410 or an external computing device, such as a server or 600 of FIG. 6.

According to various implementations disclosed herein, energy consumption engine 422 can be utilized to measure the energy consumption metrics of disaggregate memory system 400. For example, energy consumption engine 422 can measure energy consumed in performing computational tasks and, as well as energy consumed during communication (e.g., data movement between components of disaggregate memory system 400). Table 1 depicts examples of computation energy metrics (e.g., metrics associated with executing computation tasks) and communication energy metrics (e.g., energy consumed during data movement), each of which may be measured by energy consumption engine 422. For example, metrics associated with memory array 410, NMC 421, compute nodes 405, and/or one or more peer NMCs 431 in performing functions may be referred to as computation energy metrics. Metrics associated with memory channel 401, client fabric 406, and peer fabric 432 in exchanging data may be communication energy metrics. Energy consumption engine 422 can collect the energy consumption metrics as telemetry data. In an example implementation, the NMC 421 can comprises one or more power sensor 419 configured to collect power (J/s) telemetry data and integrate the collected power over time to generate energy (J) telemetry data than can then be associated with per transaction energy of a data operator. An illustrative example of a power sensor 419 is an on-die power sensor that yields power in Watts (J/s) and sums this over time yields energy in Joules.

In some cases, energy consumption metrics may be pre-store, for example, in data stores 112. For example, in the case of data operators 411 that have fixed functions (such as, but not limited to, memset( ), memchr( ), crypto, popcount( )), static power overhead (W) and per transaction (J/bit) may be held in data stores 112 and available to energy consumption engine 422. For fixed functions, static power overhead and per bit power can be determined during design and characterization. The energy consumption metrics can be pre-stored in data stores 112.

In the case of programmable data operators 411, static overhead (W) estimates and percentage of capacity per transaction (J/bit) estimates can initially be available to the NMC 421 (e.g., stored in data stores 112) and then updated using measurements once they are captured, for example, by energy consumption engine 422. For example, estimates on statice power overhead and per bit transaction power can be estimated from overall maximum and average energy consumption measured during design and characterization, and then prorated according to a percentage of resources used (e.g., if a programmable function used 50% of the resources in the NMC then an estimate of static power associated with the function would be 50% of the average, or maximum for a more conservative estimate, energy utilization measured during design and characterization). When a new programmable data operator is configured, an initial estimate based on percentage of resources utilized can be stored. As the data operator is utilized, the actual energy utilized could be collective over the operation time to refine the estimate. Additional samples can be collected over time to further improve the estimate and account for any potential data dependency. The estimates can be held in data stores 112 and updated by energy consumption engine 422.

Energy consumption engine 422 can be utilized to measure latency metrics of disaggregate memory system 400. For example, energy consumption engine 422 can measure an amount time that it takes components of disaggregate memory system 400 to complete functions. Table 2 depicts examples of these latency metrics, each of which may be measured by energy consumption engine 422. Similar to the energy consumption metrics, the latency metrics may be estimated and initially available via data stores 112, and may be updated based on measurements by energy consumption engine 422.

The energy consumption engine 422 may tag communication energy metrics using a fingerprint of the communication pathway. For example, metadata can be appended to a communication energy metric that includes data of a fingerprint indicating a source of the communication energy metric. In the case of a data request from a one or more compute nodes 405, the fingerprint may include information for identifying the communication. In an example, the fingerprint may include an identifier of the one or more compute nodes 405 (e.g., any identifying attribute that is traceable down to low level assignment, such as, but not limited to, a MAC address, component IDs, or similar given the design characteristics of the fabric utilized) that issued a request, a local address of the one or more compute nodes 405 (e.g., a local IP address, component ID, or similar), and any remote peer addresses (e.g., IP addresses, component IDs, or similar) of peer one or more compute nodes 405 that can be combined with the requesting one or more compute nodes 405 (if any). In the case of communication from memory array 410, the fingerprint may include an identifier of memory array 410 and local address. In the case of a communication from NMC 421, the fingerprint may include an identifier of NMC 421 and a local address. In this way, communication energy metrics can be associated with a source. In the case of one or more peer NMCs 431, the fingerprint may comprise a token associated with a given one or more peer NMCs 431.

In some implementations, tagging communication energy metrics with a fingerprint allows determination of a communication-based energy baseline when the NMC 421 is configured in pass-through mode. Comparison of dynamic energy associated with communications versus total energy consumed by NMC 421 with no data operators engaged (e.g., pass-through mode) can provide a static power dissipation metric. For fixed function data operators, design characterization data can provide time and per bit energy metrics for the data operators. Comparison of static dissipation metric versus data operator engaged operation can provide dynamic data operator energy estimates that can be used to derive energy consumption prediction of programmed data operator energy metrics. For example, comparison of static dissipation metric with energy consumed with a data operator invoked may indicate energy consumed by that data operator for performing a programed function. As an illustrative example, if given only static power ($Po_s$), then only an average or idle power is known. If both an idle and at load power can be measured, then a particular data operator can be associated with (and perhaps via a fingerprint) a particular client's energy consumption while using the particular data operator. As the data operators are switched out, the metric for each data operator can be estimated using similar comparison to static dissipation. In this way, the NMC static power dissipation metric ($Po_s$) can be determined, as well as NMC energy consumed per data operator and per bit processed (Eo).

Energy modeling engine 423 may be configured to use the telemetry data to model a plurality of computation scenarios for executing a data processing request by disaggregate memory system 400. The energy modeling engine 423 can obtain static overhead (in terms of W or J/s) and per transaction (J/bit) over operational lifetime due to bandwidth (bit/s) and latency (s) consumption metrics from energy consumption engine 422 so that time-based energy consumption can be calculated. For example, energy modeling engine 423 generate models for a plurality of configurations of disaggregate memory system 400 for executing one or more data processing request (e.g., tasks) from a compute node. The plurality of modeled configurations can comprise a baseline consumption model, a maximal consumption model, and one or more intermediate consumption models. The baseline consumption model may be a configuration in which NMC 421 operates as a passthrough, such that no data operator resources are consumed (e.g., no data operators invoked) and all computation functions are performed at the compute node. In this configuration, data is transferred from memory array 410 to one or more compute nodes 405 through memory interface 424 and fabric interface 425 via arrow 426, without invoking data operator resources. In the maximal consumption model, compute node-side computation may be minimal or zero and substantially all computation functions are performed by invoked data operators 411 of the NMC 421 (e.g., as shown by arrows 427*a* and 427*b*), such that compute node resource consumption is negligible. Intermediate consumption configurations may be varying degrees of computation functions performed by data operators 411 and by compute node 405 (or one or more peer NMCs 431). For example, a first intermediate consumption configuration may invoke a first data operators 411 for performing tasks, and pass through remaining functions to compute node 405. Second intermediate consumption configuration may invoke the first data operators 411 and a second data operators 411. Thus, each nth intermediate consumption configuration may invoke n-data operators 411. When n equals the number of data operators 411 resources, the model configuration would be the maximal consumption configuration.

The energy modeling engine 423 simulates each of the models using the computation and communication energy metrics obtained from energy consumption engine 422, along with latency metrics, and outputs telemetry consumption factors for modeled configuration. The telemetry consumption factors may be predictive of energy and time consumed to perform the requested task on a per modeled configuration basis. For example, each modeled configuration can be associated with a pair of telemetry consumption factors, which can be used to optimize disaggregate memory system 400 in terms of energy and time. For example, the telemetry consumption factors can comprise a first factor predictive of energy consumed to execute the requested tasks on a per modeled configuration basis and a second factor predictive of an amount of time for executing the one or more task on a per modeled scenario basis.

For example, baseline energy consumption can be modeled by energy modeling engine 423 as the energy to affect a local memory read/write operation in the memory array 410 and the communications required to move data for the operation. In this case, data operators 411 of NMC 421 are bypassed and their energy is zero. The baseline energy consumption can be modeled using computation and communication energy metrics as follows:

$$\text{BaselineEnergyClient}_n=(Ef_T+Ecf_T[n][i]+Pf_s/\text{BW}cf[n][i])*(Bc_r[n][i]+Bc_w[n][i]) \quad \text{Eq. 1}$$

$$\text{BaselineNMCEnergy}=0 \quad \text{Eq. 2}$$

$$\text{BaselineEnergyMemoryArray}=Ea_r*Bm_r+Ea_w*Bm_w+(Emc_T+Em_T+(Pa_s+Pm_s)/\text{BW}mc)*(Bm_r+Bm_w), \text{ where } Bm_{r/w}=Bm_{r/w}[n][i] \quad \text{Eq. 3}$$

Where, as set forth in Table 1 above, $Ef_T$ is fabric interface energy consumed per bit transferred; $Ecf_T$[n][i] is client fabric energy consumed per bit [i]transferred per compute node [n]; $Pf_s$ is fabric interface static power consumed; BWcf[n][i]) is client fabric bandwidth per compute node [n] per bit [i]; $Bc_r$[n][i] is number of bits [i] transferred for read operation per compute node [n]; $Bc_w$[n][i] is number of bits [i]transferred for write operation per compute node [n]; $Ea_r$ is memory array energy consumed per read operation; $Bm_r$ is number of bits read from memory array to NMC; $Ea_w$ is memory array energy consumed per write operation; $Bm_w$ is number of bits written to memory array from NMC; $Emc_T$ is Memory channel energy consumed per bit transferred; $Em_T$ is memory interface energy consumed per bit transferred; $Pa_s$ is memory array static power consumed; $Pm_s$ is memory interface static power consumed; and BWmc is client fabric bandwidth per compute node per bit.

The $\text{BaselineEnergyClient}_n$ represents predicted total energy consumed by the nth compute node in executing the task and exchanging data with the NMC 421. BaselineNMCEnergy represents predicted total energy consumed by the NMC 421, which is assumed to be 0 in this case. The BaselineEnergyMemoryArray represents predicted total energy consumed by the memory array 410 in executing the task and exchanging data with the NMC 421. The sum of Eqs. 1-3 may represent a first factor associated with the baseline consumption configuration (also referred to herein as a first consumption configuration). In this example, metrics from nth compute node may be tagged with a fingerprint for compute node as described above, so that the task can be tracked through the system.

In an example maximal energy consumption model for a communication-only data operator request, client-side energy consumption can be assumed to be negligible and can be replaced by an NMC model that is dependent on a per bit and duration-based model. In this scenario, the operation on the memory array 410 may be the same as Eq. 3 since the same activity will still take place on the memory array 410.

The maximal energy consumption in this example can be modeled as follows:

$$\text{MaxEnergyClient}_n = 0 \quad \text{Eq. 4}$$

$$MaxNMCEnergy = Eo^*(Bo_r + Bo_w) + Po_s^* Lo_s, \text{ where} \quad \text{Eq. 5}$$

$$Bo_{r/w} = Bo_{r/w}[n][i]$$

$$\text{MaxEnergyMemoryArray} = Ea_r * Bo_r + Ea_w * Bo_w + \left(+Emc_T + Em_T + (Pa_s + Pm_s)/BWmc\right) * (Bo_r + Bo_w) \quad \text{Eq. 6}$$

Where, with reference to Tables 1 and 2, Eo is NMC energy consumed per bit processed per data operator; $Po_s$ is NMC static power consumed; $Lo_s$ is NMC execution latency; $Ea_r$ is memory array energy consumed per read operation; $Bo_r$ is NMC bits processed for read operation per data operator per bit; $Ea_w$ is memory array energy consumed per write operation; $Bo_w$ is NMC bits processed for write operation per data operator per bit; $Emc_T$ is Memory channel energy consumed per bit transferred; $Em_T$ is memory interface energy consumed per bit transferred; $Pa_s$ is memory array static power consumed; $Pm_s$ is memory interface static power consumed; and BWmc is client fabric bandwidth per compute node per bit.

The $\text{MaxEnergyClient}_n$ represents predicted total energy consumed by the nth compute node in executing the task and exchanging data with the NMC 421, which is assumed to be 0 in this case. MaxNMCEnergy represents predicted total energy consumed by the NMC 421, for example, based on invoking 41// to perform all computation functions of the requested task. The MaxEnergyMemoryArray represents predicted total energy consumed by the memory array 410 in executing the task and exchanging data with the NMC 421. The sum of Eqs. 4-6 may represent a first factor associated with the maximal consumption configuration. Metrics from nth compute node may be tagged with a fingerprint for compute node as described above, so that the task can be tracked through the system.

As shown above, the NMC Energy of Eq. 5 can initially be assumed to be zero, since it is offsetting a potentially unknown compute node-side energy contribution. From this initial state, static and per bit contributions can be derived by local power telemetry metrics. While this may not provide a complete end-to-end comparison of energy consumption on both one or more compute nodes 405 and NMC 421, it does allow a relative comparison of energy cost in the NMC 421 to aid in resource optimization.

For more complex data operators which include peer NMC communication, that energy can be modeled using the peer fabric metrics (e.g., as shown in Table 1 and Table 2). For example, computation energy metrics for each peer NMC 431 can be modeled using a similar equation as used for NMC 421 (e.g., Eq. 5), based on a number of invoked data operators, and using the peer fabric 432 metrics for communication energy metrics. Some intermediate modeled configurations may include utilizing one or more peer NMCs 431 explore further configuration options. The model may be substantially similar to client fabric metrics in the case of a unified fabric.

Optimization engine 428 may select a modeled configuration of the plurality of modeled configurations for executing the requested task (or tasks). For example, optimization engine 428 may obtain the telemetry consumption factors and associated modeled configurations from energy modeling engine 423, and use the telemetry consumption factors to select a modeled configuration to execute the requested task (or tasks). The optimization engine 428 may select modeled configuration that optimizes the disaggregate memory system 400 for performing the requested task (or tasks) in terms of energy and time to completion. This may include balancing time and energy consumed so to minimize both factors.

Optimization engine 428 may rank each modeled configuration according to one or more telemetry consumption factors. For example, the optimization engine 428 may rank the modeled configurations according to the first factor associated therewith, with the modeled configurations ordered from lowest predicted energy consumption (e.g., smallest first factor) to largest. As another example, the optimization engine 428 may rank the modeled configurations according to the second factor associated therewith, with the modeled configurations ordered from smallest amount of time to completion (e.g., smallest second factor) to largest. That is, fastest completion time to slowest completion time. In another example, the first and second factors may be balanced according to a tradeoff to optimize disaggregate memory system 400 by minimizing both the first and second factors.

The tradeoff between time consumed and energy consumed may be considered as part of selecting a modeled configuration. For example, depending on an energy consumption or time-to-completion constraints set within disaggregate memory system 400, optimization engine 428 can select telemetry consumption factors to align with the constraints so to optimize the disaggregate memory system 400 according to the set constraints. For example, energy consumption and/or time constraints may be set by a user, which can be set as criteria considered in selecting a modeled configuration. The telemetry consumption factors for each modeled configuration may be referenced by the optimization engine 428 and used to locate one or more modeled configurations that satisfy the criteria. For example, a user may input a desired time-to-completion for executing requested task, and optimization engine 428 may locate one or more modeled configurations having a second factor that satisfies the desired execution time. From the one or more modeled configurations, an optimal modeled configuration may be selected that provides the lowest energy consumption, while satisfying the time criteria. As another example, a user may input desired energy consumption, which can be used to filter modeled configurations to one or more modeled configurations that satisfy the desired energy consumption. From there, a modeled configuration having the fasted time-to-execution (e.g., lowest second factor) may be selected. Other implementations are possible in view of different combinations of energy and time constraints.

In an example implementation, optimization engine 428 may assign one or more of the data operators 411 according to the selected modeled configuration. For example, the optimization engine 428 may obtain the telemetry consumption factors and use the factors to select a configuration for disaggregate memory system 400 as described above. Data operator 411 usage may be invoked according to the selected model configuration. Data operators may be assigned or reassigned in order to configure NMC 421 according to the selected modeled configuration.

According to some implementations, optimization by the optimization engine 428 can be performed on an operator basis, for example by assigning tasks to data operators 411 to optimize energy consumption locally within the NMC 421. For example, optimization can include assigning data operators 411 within NMC 421 in accordance with the selected modeled configuration. Optimization on a data operator basis of the NMC 421 may be referred to as localized management of data operators 411. Under this approach, the NMC 421 can be optimized by minimization of energy consumption by the NMC 421, for example, by pushing computation functions back to the compute nodes 405 and thus achieving a local optimization at the expense of a global optimization. In this case, the NMC 421 can return exception conditions to the requesting compute nodes 405 that push functions back to one or more compute nodes 405. Such operation can be done across any collection of the fingerprints, such as, requesting client, local destination address region, and remote peer address region or provided token up to a federation of peer NMCs 431. That is, NMC 421 can push computation to any source based on the fingerprint associated with the request.

Optimization can also be performed globally, for example, by assigning tasks to peer NMC 431 (and data operators therein). This operation may be referred to as global management of NMC operators. For example, if compute node-side computational energy is known, then end-to-end energy projections can be used to optimize total energy consumed across disaggregate memory system 400, for example, by pushing computation functions to one or more peer NMCs 431 to achieve a desired outcome. Furthermore, in addition to bandwidth metrics and total data size in terms of bits, if average latency metrics are also known for the memory channel 401 and memory array 410, then time to completion can also be modeled.

If both energy and time-to-completion are known, then demand and margin shaping can be implemented by customers and service providers. For example, telemetry data available as an optimization consideration in accordance with implementations disclosed herein can also be included in revenue structure of customers and service providers. Thereby, allowing increases in energy efficiency and sustainable operations offered at higher margins. Furthermore, the ability to measure energy consumption of NMC 421 can afford customers and service provides informed choice in trading off performance versus energy versus infrastructure cost, as described above. That is, disaggregate memory system 400 can be implemented to provide an ability to measure consequences of data operations in the disaggregated memory system, and therefore, customers can utilize disaggregate memory system 400 to optimize operations for the lowest energy use. In another example, network operators can use disaggregate memory system 400 to minimize costs in providing resource through tradeoff of time to solution versus energy to solution.

Figure 5:
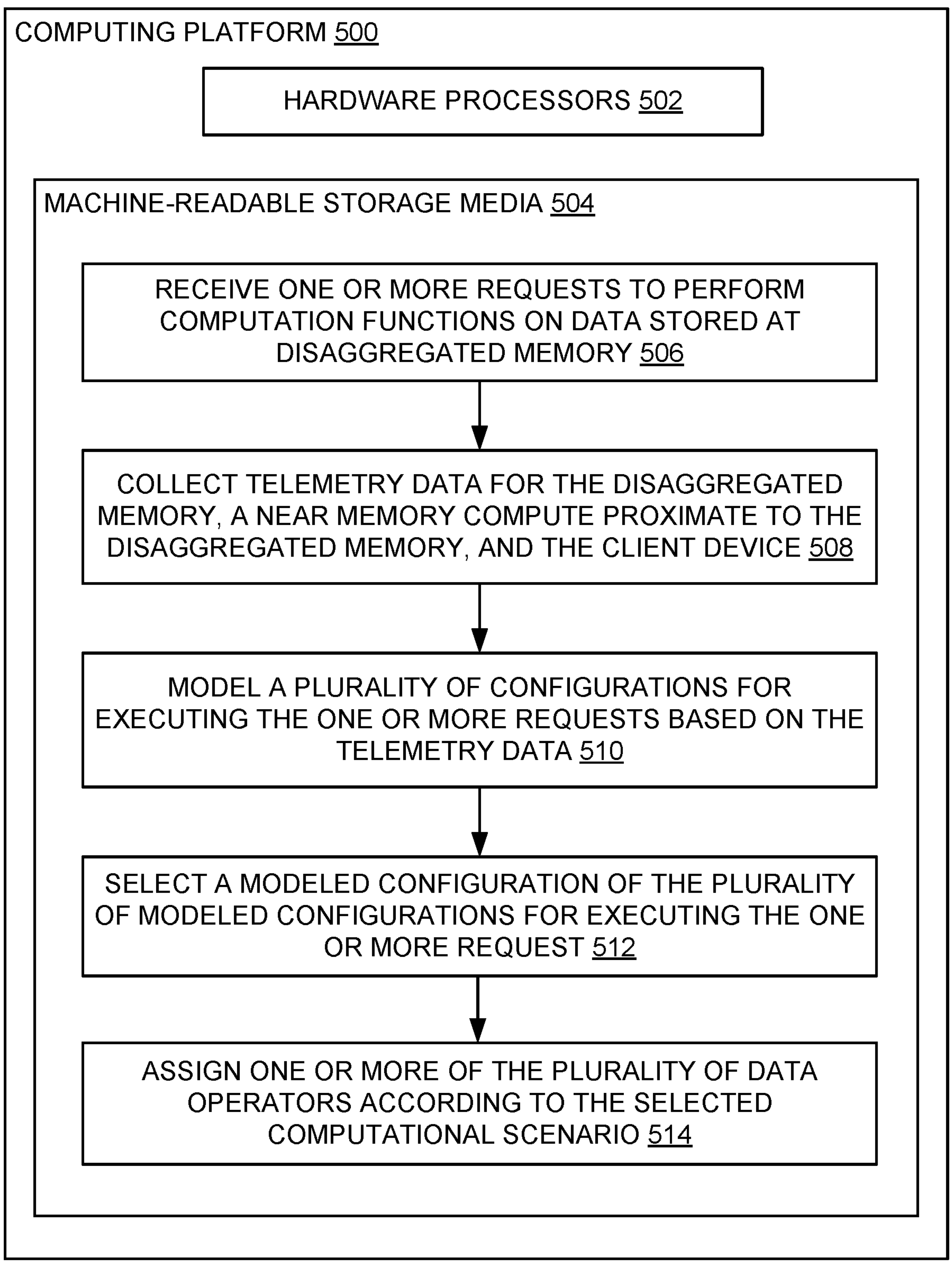
FIG. 5 is an example computing component that may be used to implement various features of energy consumption optimization in disaggregated memory systems in accordance with the implementations disclosed herein.

FIG. 5 illustrates an example computing component that may be used to implement energy consumption optimization in disaggregated memory systems in accordance with various embodiments. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-514, to control processes or operations for energy consumption optimization in a disaggregated memory system. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to receive one or more requests to perform computation functions on data stored at disaggregated memory. For example, a compute node may issue a request to perform one or more task to a memory node (or memory array) of a disaggregated memory system (e.g., disaggregate memory system 400). The requested task may be executed on data stored in the memory node through one or more computation functions.

Hardware processor 502 may execute instruction 508 to collect telemetry data for the disaggregated memory, a near memory compute proximate to the disaggregated memory, and the compute node. For example, as explained above, telemetry data may be obtained that includes computation and communication energy consumption metrics for each component of the disaggregate memory system. The near memory compute may comprise a plurality of data operators, each of which may be invoked for performing computation functions and, therefore, consume energy.

Hardware processor 502 may execute instruction 510 to model a plurality of configurations for executing the one or more requests based on the telemetry data. For example, instruction 510 may include generating a plurality of modeled configurations of disaggregate memory system for performing the task requested by the compute node. The plurality of modeled configurations may include a first consumption model (e.g., a baseline consumption model) in which no data operators are invoked, a second consumption model (e.g., a maximal consumption model) in which substantially all of the computation functions are performed by data operators, and one or more intermediate consumption models, each of which perform varying degrees of computation functions using varying numbers of data operators. In some embodiments, instruction 510 may be executed responsive to receiving the request from the compute node.

Instruction 510 may also include generating a plurality of telemetry consumption factors for each modeled configuration. The telemetry consumption factors, for each modeled configuration, may include a first factor indicative of energy consumption by a respective modeled configuration in executing the one or more requests and a second factor indicative of an amount of time consumed by the respective modeled configuration in executing the one or more requests.

Hardware processor 502 may execute instruction 512 to select a modeled configuration of the plurality of modeled configurations for executing the one or more request. For example, the telemetry consumption factors may be referenced and used to select a modeled configuration associated with telemetry consumption factors that optimize the disaggregate memory system in terms of energy and time-to-completion for performing the requested task. As explained above, the selection may be based on minimizing both the first and second factor, as well as based on a threshold criteria for one or more of energy consumption and time-to-completion. The threshold criteria may be set based on a user input.

Hardware processor 502 may execute instruction 514 to assign one or more of the plurality of data operators according to the selected modeled configuration.

Figure 6:
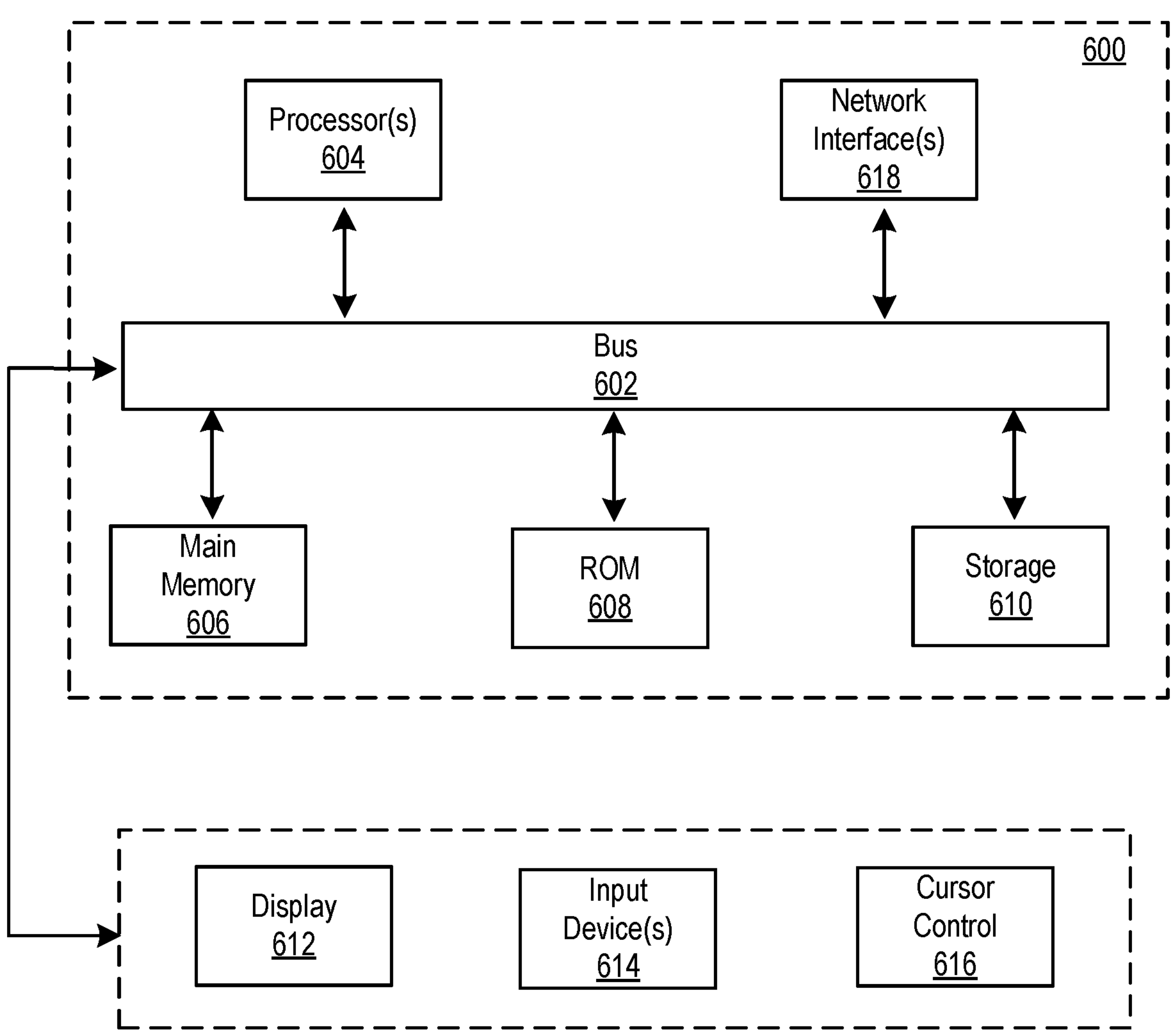
FIG. 6 illustrates a block diagram of an example computer system that may be used to implement various features of energy consumption optimization in disaggregated memory systems of the present disclosure.

FIG. 6 depicts a block diagram of an example computer system 600 in which various of the embodiments described herein may be implemented. The computer system 600 may be an example implementation of architecture 100 or any component thereof. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for optimizing energy consumption in a disaggregated memory system, the method comprising:

receiving, from a compute node, a set of one or more requests to perform computation functions on data stored at disaggregated memory;

collecting telemetry data for the disaggregated memory, a near memory compute proximate to the disaggregated memory, and the compute node;

modeling a plurality of configurations of the near memory compute for executing the set of requests based on the telemetry data;

selecting a modeled configuration of the plurality of modeled configurations for executing the set of requests; and assign one or more of a plurality of data operators of the near memory compute according to the selected modeled configuration, wherein the plurality of modeled configurations comprises:

a first consumption configuration in which the near memory compute is configured in pass-through mode for executing the set of requests;

a second consumption configuration in which the near memory compute is configured to perform all computation functions for executing the one or more request using the plurality of data operators; and one or more intermediate consumption configurations in which the near memory compute is configured to perform one or more computation functions for executing the one or more request using the plurality of data operators and configured in pass-through mode for remaining computation functions.

2. The method of claim 1, wherein the telemetry data comprises computation energy metrics indicative of energy consumed by the disaggregated memory, the near memory compute, and the compute node.

3. The method of claim 2, wherein the computation energy metrics comprises energy consumed per bit of data processed and static power consumed for each of the disaggregated memory, the near memory compute, and the compute node.

4. The method of claim 1, wherein the telemetry data comprises communication energy metrics indicative of energy consumed in exchanging data between the disaggregated memory and the near memory compute, and between the near memory compute and the compute node.

5. The method of claim 4, wherein the communication energy metrics comprises energy consumed per bit of data transferred over a memory interface between the disaggregated memory and the near memory compute and over an interconnect interface between the near memory compute and the compute node.

6. The method of claim 1, further comprising:

generating telemetry consumption factors for each modeled configuration of the plurality of modeled configurations, the telemetry consumption factors comprising a first factor indicative of energy consumption by a respective modeled configuration in executing the one or more requests, and a second factor indicative of an amount of time consumed by the respective modeled configuration in executing the one or more requests.

7. The method of claim 6, further comprising:

selecting a modeled configuration from the plurality of modeled configurations based on minimizing the first factor and the second factor of the telemetry consumption factors.

8. The method of claim 6, further comprising:

obtaining optimization criteria defining a threshold for at least one of the first factor and the second factor, wherein selecting the modeled configuration from the plurality of modeled configurations comprising selecting a modeled configuration that satisfies the threshold for at least one of the first factor and the second factor.

9. A disaggregated memory system, the system comprising:

one or more memory nodes storing data;

at least one near memory compute function communicably coupled to a first memory node of the one or more memory nodes by a memory interface, the at least one near memory compute function comprising one or more data operators;

at least one compute node communicably coupled to the at least one near memory compute function by a network interface; and at least one processor configured to execute instructions stored in a memory to:

collect a plurality of energy consumption metrics indicative of energy consumption by the disaggregated memory system for executing a data processing requests;

receive the data processing request from the compute node;

generate a plurality of modeled configurations of the disaggregated memory system for performing the data processing request from the compute node based on the energy consumption metrics;

generate telemetry consumption factors for each of modeled configuration of the plurality of modeled configuration; and execute the data processing request from the compute node using a modeled configuration selected from the plurality of modeled configurations based on the telemetry consumption factors, wherein the plurality of modeled configurations comprises:

a first consumption configuration in which the at least one near memory compute function is configured in pass-through mode for executing the data processing request;

a second consumption configuration in which the at least one near memory compute function is configured to perform all computation functions for executing data processing request using the one or more data operators; and one or more intermediate consumption configurations in which the at least one near memory compute function is configured to perform one or more computation functions for executing the data processing request using the one or more data operators and configured in pass-through mode for remaining computation functions.

10. The system of claim 9, wherein the telemetry consumption factors comprise one or more of: a first factor indicative of energy consumption by a respective modeled configuration in executing the one or more requests, or a second factor indicative of an amount of time consumed by the respective modeled configuration in executing the one or more requests.

11. The system of claim 10, wherein the at least one processor is further configured to execute instructions to:

obtain optimization criteria defining a threshold for at least one of the first factor and the second factor, wherein selecting the modeled configuration from the plurality of modeled configurations comprising selecting a modeled configuration that satisfies the threshold for at least one of the first factor and the second factor.

12. The system of claim 9, wherein the telemetry data comprises computation energy metrics indicative of energy consumed by the one or more memory nodes, the at least one near memory compute function, and the at least one compute node, and wherein the telemetry data comprises communication energy metrics indicative of energy consumed in exchanging data between the one or more memory nodes and the at least one near memory compute function, and between the at least one near memory compute function and the at least one compute node.

13. A near memory computing node proximate to a disaggregated memory, the near memory computing node comprising:

a plurality of data operators configured to perform computation functions on data stored at the disaggregated memory in response to one or more requests from a compute node;

a consumption engine configured to collect telemetry data for the disaggregated memory, the near memory computing node, and the compute node;

a modelling engine configured to model a plurality of configurations for executing the one or more requests based on the telemetry data; and an optimization engine configured to select a modeled configuration of the plurality of modeled configuration for executing the one or more requests from the compute node, and assign one or more of the plurality of data operators according to the selected modeled configuration, wherein the plurality of modeled configurations comprises:

a first configuration in which the near memory computing node is configured in pass-through mode for executing the one or more requests;

a second configuration in which the near memory computing node is configured to perform all computation functions for executing the one or more request using the plurality of data operators; and one or more intermediate configurations in which the near memory computing node is configured to perform one or more computation functions for executing the one or more request using the plurality of data operators and configured in pass-through mode for remaining computation functions.

14. The near memory computing node of claim 13, wherein the modelling engine is further configured to generate telemetry consumption factors for each modeled configuration of the plurality of modeled configurations, the telemetry consumption factors comprising a first factor indicative of energy consumption by a respective modeled configuration in executing the one or more requests, and a second factor indicative of an amount of time consumed by the respective modeled configuration in executing the one or more requests.

15. The near memory computing node of claim 14, wherein the optimization engine is further configured to select a modeled configuration from the plurality of modeled configurations based on minimizing the first factor and the second factor of the telemetry consumption factors.

16. The near memory computing node of claim 14, wherein the optimization engine is further configured to obtain optimization criteria defining a threshold for at least one of the first factor and the second factor, wherein the optimization engine is further configured to select a modeled configuration from the plurality of modeled configurations that satisfies the threshold for at least one of the first factor and the second factor.

17. The near memory computing node of claim 13, wherein the telemetry data comprises computation energy metrics indicative of energy consumed by the disaggregated memory, the near memory computing node, and the compute node.

18. The near memory computing node of claim 17, wherein the computation energy metrics comprises energy consumed per bit of data processed and static power consumed for each of the disaggregated memory, the near memory computing node, and the compute node.

19. The near memory computing node of claim 13, wherein the telemetry data comprises communication energy metrics indicative of energy consumed in exchanging data between the disaggregated memory and the near memory computing node, and between the near memory computing node and the compute node.

20. The near memory computing node of claim 19, wherein the communication energy metrics comprises energy consumed per bit of data transferred over a memory interface between the disaggregated memory and the near memory computing node and over an interconnect interface between the near memory computing node and the compute node.

* * * * *